US011313872B2

(12) United States Patent
Onuki et al.

(10) Patent No.: US 11,313,872 B2
(45) Date of Patent: Apr. 26, 2022

(54) DISPENSING DEVICE AND SAMPLE ANALYSIS DEVICE

(71) Applicant: Hitachi High-Technologies Corporation, Tokyo (JP)

(72) Inventors: Kazutoshi Onuki, Tokyo (JP); Shigeki Matsubara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 241 days.

(21) Appl. No.: 16/642,398

(22) PCT Filed: Oct. 31, 2017

(86) PCT No.: PCT/JP2017/039228
§ 371 (c)(1),
(2) Date: Feb. 27, 2020

(87) PCT Pub. No.: WO2019/087271
PCT Pub. Date: May 9, 2019

(65) Prior Publication Data
US 2020/0191816 A1 Jun. 18, 2020

(51) Int. Cl.
*G01N 35/10* (2006.01)
*G01N 35/00* (2006.01)

(52) U.S. Cl.
CPC .............. *G01N 35/1002* (2013.01); *G01N 2035/00346* (2013.01)

(58) Field of Classification Search
CPC ..... G01N 2035/00346; G01N 35/1016; G01N 2035/00534; G01N 2035/00425; G01N 2035/1048; G01N 35/1002
See application file for complete search history.

(56) References Cited

U.S. PATENT DOCUMENTS 6,267,927 B1 * 7/2001 Pomar Longedo .. G01N 35/028
422/510
6,589,483 B1 * 7/2003 Maeda ................. B01L 3/0217
222/249

(Continued)

FOREIGN PATENT DOCUMENTS

JP 10-15822 A 1/1988
JP 63-248451 A 10/1988

(Continued)

OTHER PUBLICATIONS

International Search Report of PCT/JP2017/039228 dated Dec. 19, 2017.

*Primary Examiner* — Shogo Sasaki
(74) *Attorney, Agent, or Firm* — Mattingly & Malur, PC

(57) ABSTRACT

In dispenser-type reagent dispensing, because a reagent is transferred through a piping flow path to a prescribed position and dispensed, some of the reagents may remain in the piping flow path and reagent crystallization may consequently occur in the piping flow path. Thus, crystallization prevention for the entire piping flow path must be taken into consideration. Provided is a dispensing device that comprises a reagent suction pipe for sucking in a reagent from a reagent vessel, a liquid transfer mechanism for transferring the reagent, a nozzle for discharging the reagent, and a reagent discharge pipe that is connected to the reagent container and a port that can be connected to the nozzle. The dispensing device is characterized in that the reagent is dispensed from the nozzle into a reaction vessel and when the reagent is not being dispensed, the nozzle and the port are connected and the reagent is circulated.

8 Claims, 4 Drawing Sheets

(56) References Cited

U.S. PATENT DOCUMENTS

| | | | | |
|---|---|---|---|---|
| 7,541,001 B2* | 6/2009 | Kraemer | ............... | G01N 35/109 |
| | | | | 422/561 |
| 8,337,779 B2* | 12/2012 | Miyashita | ........... | G01N 35/1079 |
| | | | | 422/512 |
| 9,278,349 B2* | 3/2016 | Haack | ................. | G01N 35/1072 |
| 2013/0121881 A1 | 5/2013 | Ishizawa et al. | | |

FOREIGN PATENT DOCUMENTS

| | | |
|---|---|---|
| JP | 11-319685 A | 11/1999 |
| JP | 2002-267675 A | 9/2002 |
| JP | 2010-48738 A | 3/2010 |
| JP | 2012-26987 A | 2/2012 |

\* cited by examiner

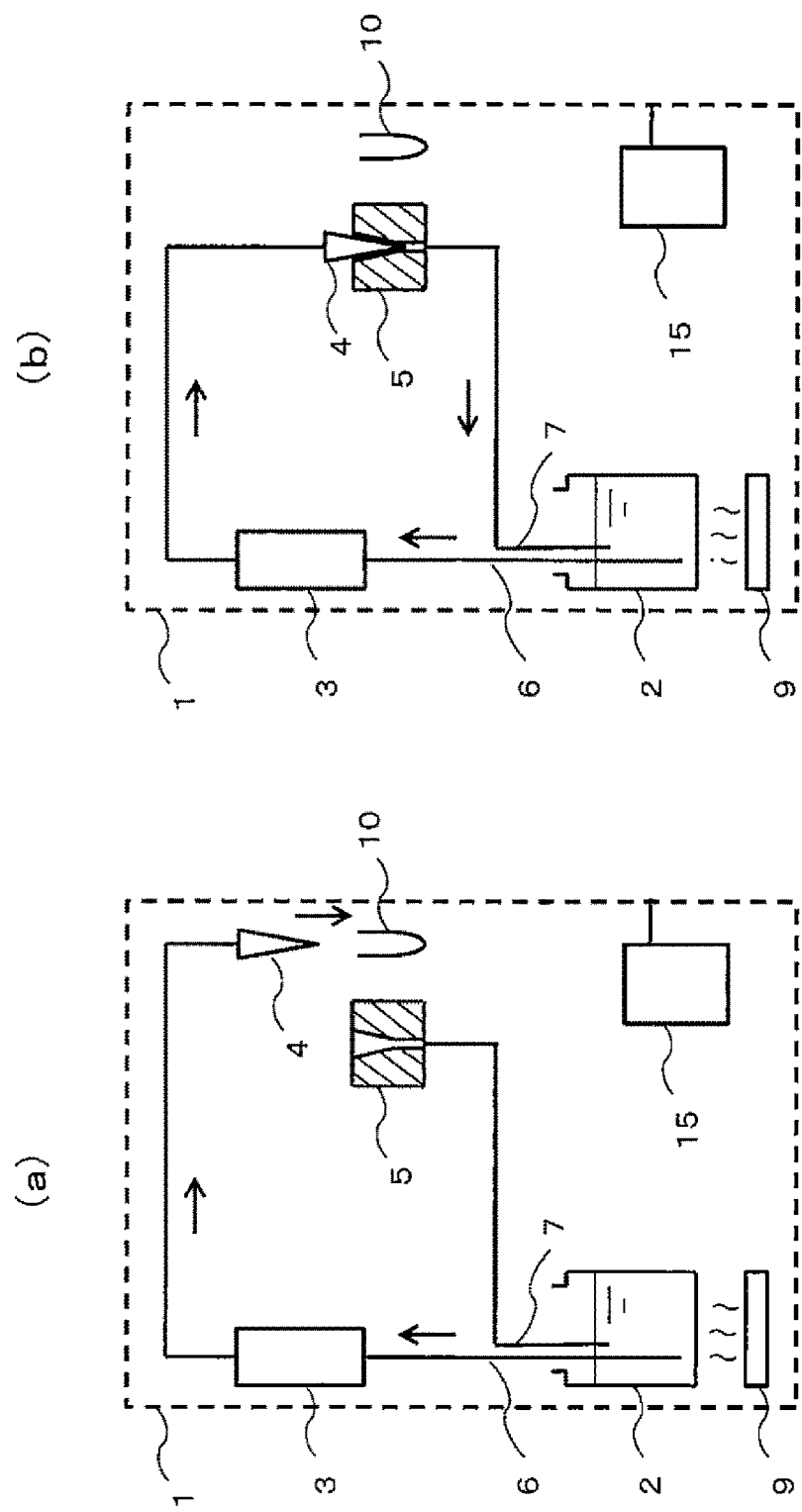
[FIG. 1]

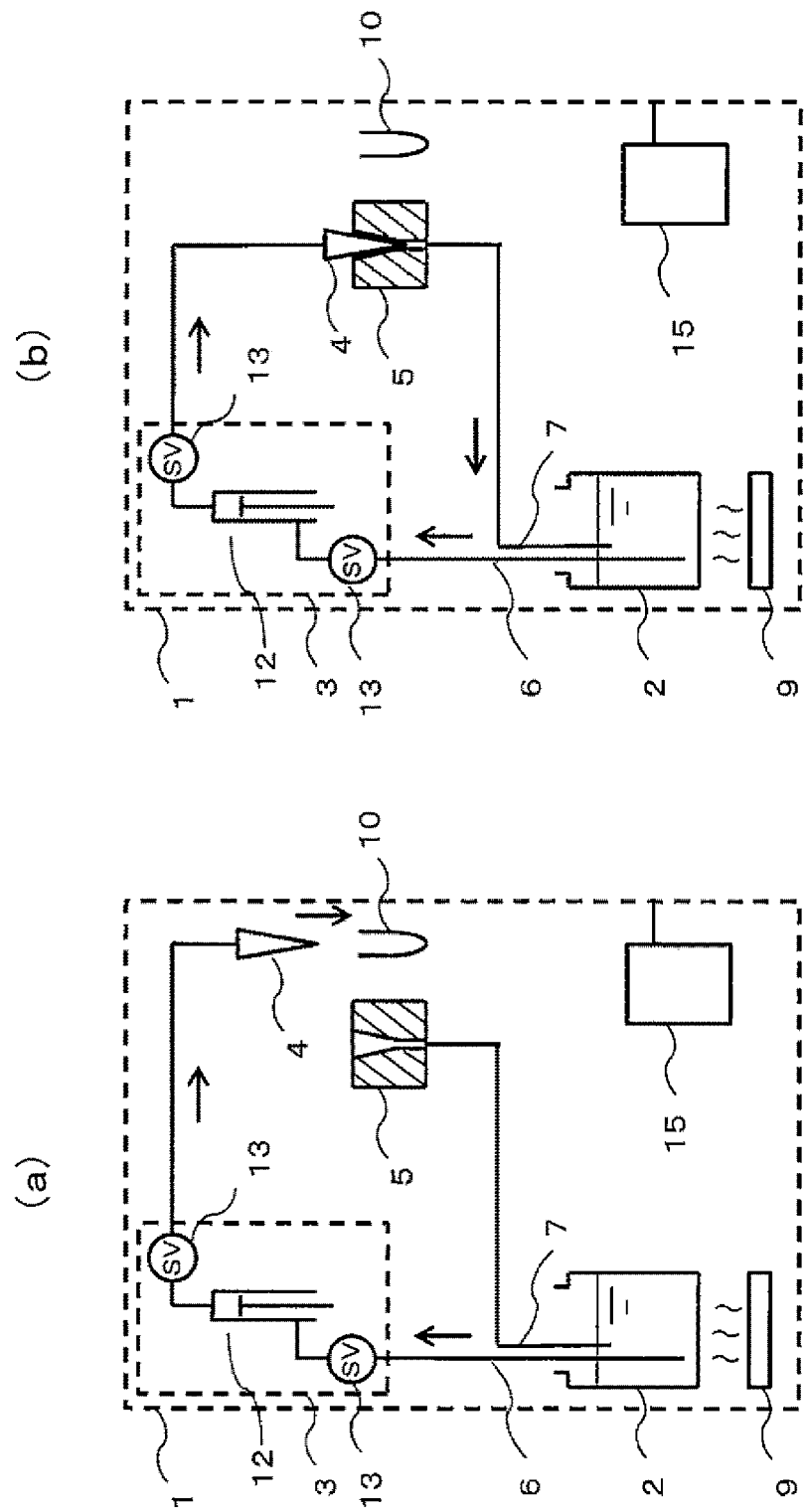
[FIG. 2]

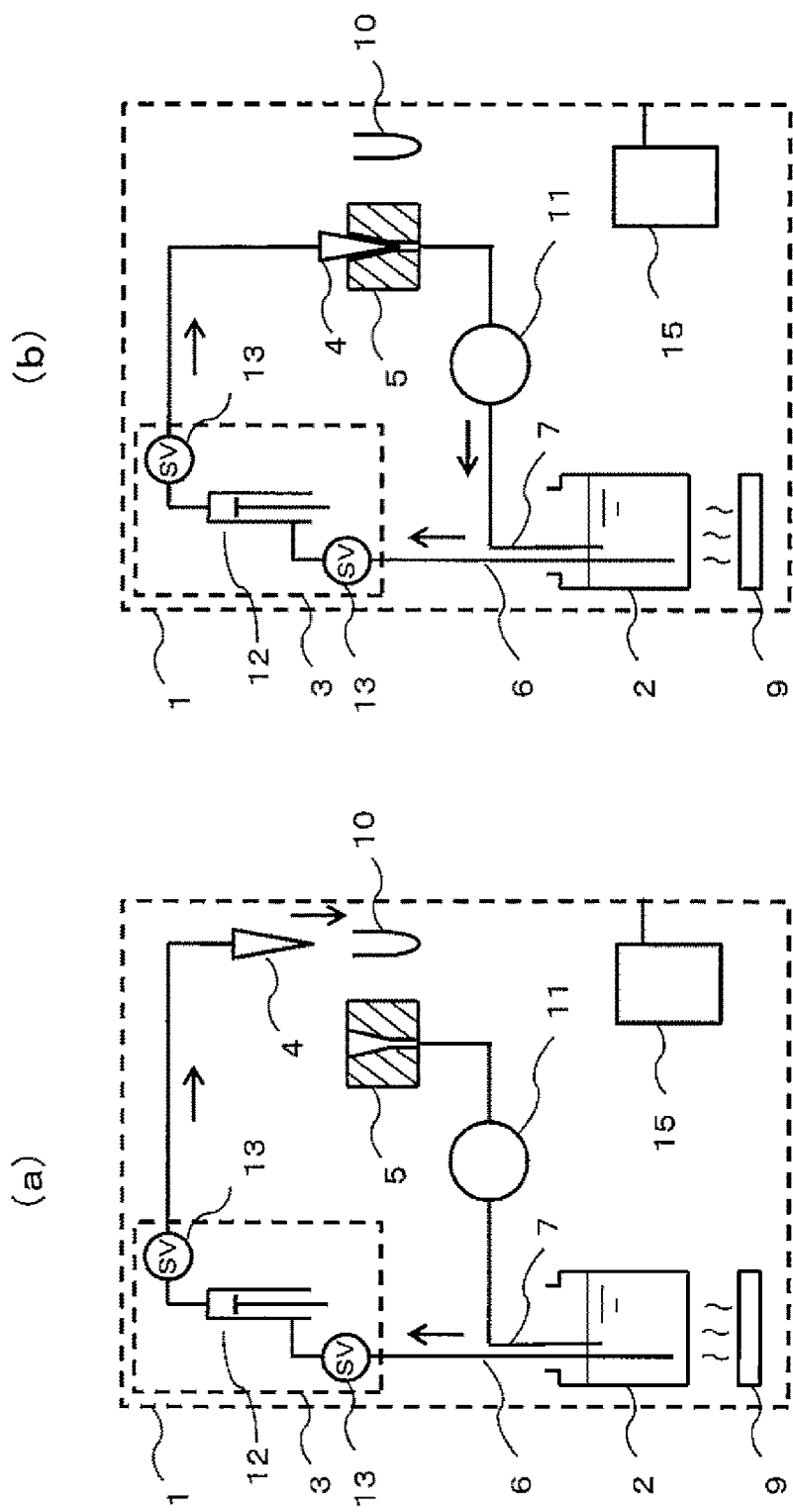
[FIG. 3]

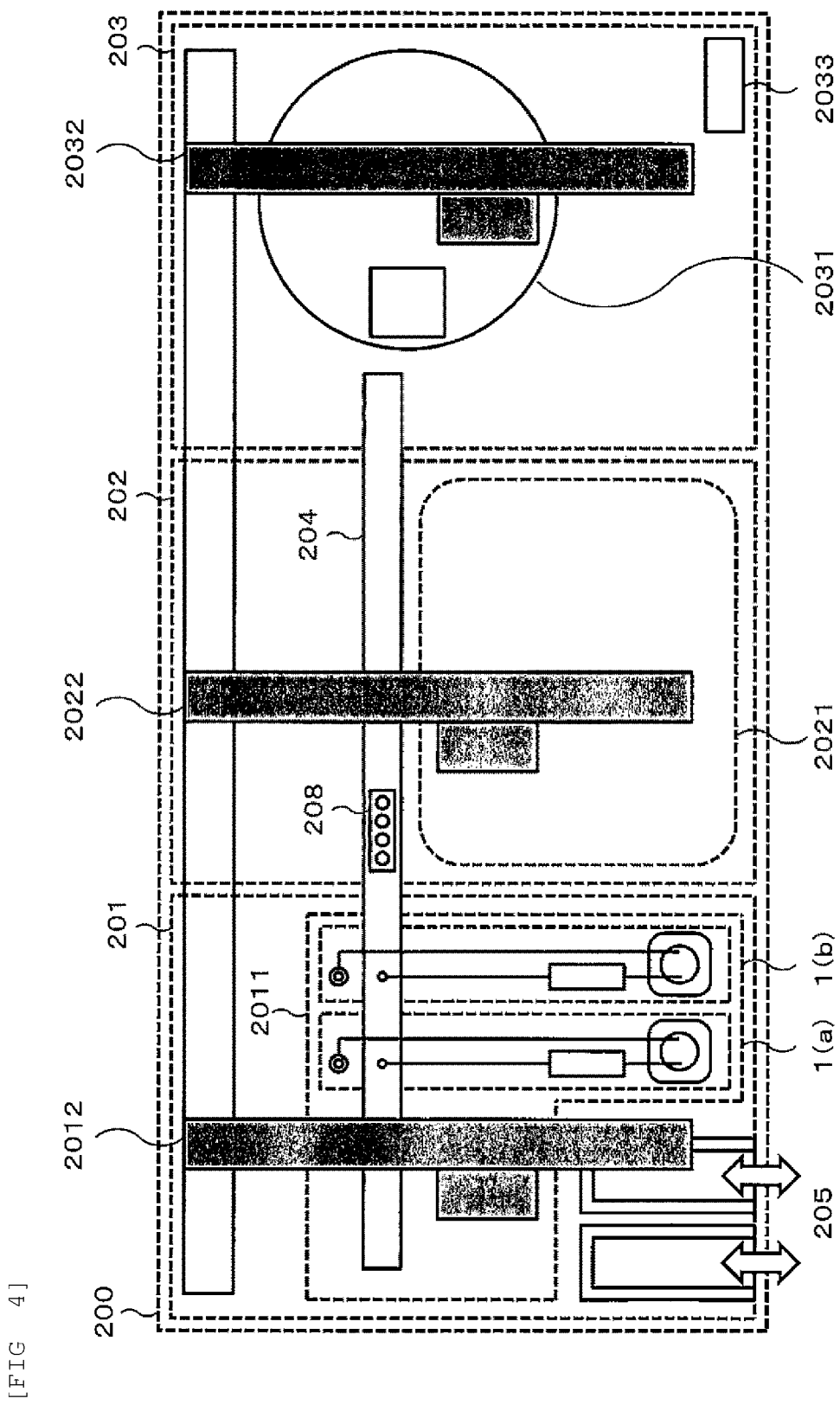
[FIG. 4]

DISPENSING DEVICE AND SAMPLE ANALYSIS DEVICE

TECHNICAL FIELD

The present invention relates to a dispensing device that handles reagents requiring to be kept warm and a sample analysis device.

BACKGROUND ART

Analysis of nucleic acids contained in biological samples, such as blood, plasma, and tissue fragment, is conducted in various fields, including not only academic researches such as biology, biochemistry, and medicine, but also industries for diagnosis, breed improvement for agricultural crops, and food inspection. The most popular method for analyzing the nucleic acid is a technique called polymerase chain reaction (PCR), in which a base sequence of the nucleic acid in a region to be analyzed is amplified specifically. Further, there is an increasing demand for automatically separating and purifying nucleic acids so that the nucleic acids can be amplified by PCR and the like, and devices for automatically extracting the nucleic acids have been provided by various companies.

In order to separate and purify nucleic acids such as DNA and RNA from a biological sample, reagents containing a chaotropic agent such as guanidine hydrochloride are used. Some of these reagents have a very high salt concentration, and salts may crystallize even at a room temperature of about 20° C. Since crystallization affects reaction by changing a concentration of a reagent and causes clogging in a pipe, it is necessary to prevent the crystallization in the device that automatically extracting the nucleic acids. A method for preventing the crystallization includes heating of a reagent container and shaking and stirring of the container and the like.

In the related art, in an automatic nucleic acid extraction device, pipetting-type dispensing, in which the reagent is sucked from the reagent container using a dispensing tip for dispensing the reagent and discharged into a reaction container, has been used. In the pipetting-type dispensing, if the crystallization of the reagent in the reagent container is prevented, it is not necessary to prevent the crystallization in a dispensing step. Therefore, methods such as the heating of the reagent container are effective.

However, in recent years, a multi-sample treatment has been required even in genetic test. Since the reagent to be extracted is a reagent commonly used between samples, in the case of the multi-sample treatment, dispenser-type dispensing is more efficient than pipetting-type dispensing using the dispensing tip because many continuous dispensations are possible.

CITATION LIST

Patent Literature

PTL 1: JP-A-2002-267675

SUMMARY OF INVENTION

Technical Problem

In dispenser-type reagent dispensing, since the reagent is transferred and dispensed to a predetermined position through a pipe flow path, the reagent always stays in the pipe flow path for a certain time. Therefore, in a case of a reagent containing a high concentration of a guanidine salt used for extracting the nucleic acid, the crystallization may occur in the pipe flow path.

As described above, there are methods for preventing the crystallization of the reagent, such as heating of the reagent container and shaking and stirring of the container. However, in the case of the dispenser-type, it is necessary to consider not only the crystallization prevention in the reagent container but also crystallization prevention in the entire pipe flow path.

In a device described in PTL 1, by heating a dispensing nozzle on an end of a discharge side of the pipe flow path, a temperature of the refrigerated reagent is raised to stabilize a reaction between a sample and the reagent.

However, the crystallization in the entire pipe flow path cannot be prevented only by heating the dispensing nozzle.

In order to prevent the crystallization in the entire pipe flow path, it is conceivable to heat the entire pipe flow path. However, 1) there is a possibility that a flow path length may be extremely long depending on a configuration of the device, and 2) when there are a plurality of reagent discharge positions, the flow path including the dispensing nozzle becomes a movable portion. For the above reason, it is not practical to heat the entire pipe flow path from the viewpoint of structure and cost.

The invention has been made in view of the above, and an object of the invention is to provide a device that prevents crystallization of a reagent even when there is a place where a heating mechanism is difficult to dispose, and can perform stable dispensing.

Solution to Problem

The present application includes methods for solving the above problems, and in one example, a dispensing device is provided. The dispensing device includes: a nozzle configured to discharge a reagent into a reaction container; a reagent suction pipe connecting the nozzle and a reagent container holding the reagent; a port capable of being connected to the nozzle; a reagent discharge pipe connecting the port and the reagent container; a liquid transfer mechanism capable of transferring the reagent into the reagent suction pipe and the reagent discharge pipe; and a control unit configured to control a connection state of the nozzle and the port, and liquid transfer of the liquid transfer mechanism. When the reagent is dispensed, the control unit performs control such that the nozzle and the port are disconnected, and the reagent sucked from the reagent container through the reagent suction pipe is discharged into the reaction container. When the reagent is not dispensed, the control unit performs control such that the nozzle and the port are connected, and the reagent in the reagent container is circulated into the reagent suction pipe and the reagent discharge pipe.

Further, in order to achieve the above object, there is provided a sample analysis device in which these dispensing devices are mounted.

Advantageous Effect

According to the invention, there exists an effect that crystallization of the reagent is prevented by circulating the reagent, and stable dispensing and analysis can be performed. Further features of the invention will become apparent from the description of the invention and the accompanying drawings. Further, problems, configurations, and effects other than those described above will be clarified by the descriptions of the following embodiments.

BRIEF DESCRIPTION OF DRAWINGS

FIG. 1 is a schematic configuration diagram of a dispensing device according to Embodiment 1.

FIG. 2 is a schematic configuration diagram of the dispensing device using a syringe pump according to Embodiment 1.

FIG. 3 is a schematic configuration diagram of a dispensing device according to Embodiment 2.

FIG. 4 is a schematic configuration diagram of a sample analysis device in which a dispensing device is mounted according to Embodiment 3.

DESCRIPTION OF EMBODIMENTS

Hereinafter, various embodiments of the invention will be described in detail with reference to the drawings. Although the drawings show embodiments in accordance with the principles of the invention, the embodiments are provided for the purpose of understanding the invention, and are not to be used for limiting interpretation of the invention.

Embodiment 1

FIG. 1 is a schematic configuration diagram of a dispensing device according to Embodiment 1. As shown in FIG. 1, a dispensing device 1 according to the present embodiment includes a reagent container 2 containing a reagent, a liquid transfer mechanism 3, a nozzle 4, a port 5, a reagent suction pipe 6, a reagent discharge pipe 7, a temperature control mechanism 9, and a control unit 15. The reagent suction pipe 6 is connected from the reagent container 2 to the liquid transfer mechanism 3 and from the liquid transfer mechanism 3 to the nozzle 4.

Specifically, a syringe, a pump, and the like can be used as the liquid transfer mechanism 3. The liquid transfer mechanism 3 has a function of sucking the reagent from the reagent container 2. FIG. 2 shows an example in which a syringe pump is used for the liquid transfer mechanism 3. In this case, the liquid transfer mechanism 3 includes a syringe pump 12 and an electromagnetic valve 13. Further, the liquid transfer mechanism 3 has a function of dispensing the reagent into a reaction container 10 and circulating the reagent. Specifically, the temperature control mechanism 9 has a function of heating the reagent in the reagent container 2 and keeping the reagent warm by using a heater, a Peltier element, and the like. The temperature control mechanism 9 is disposed below the reagent container 2 as an example. The temperature control mechanism 9 may be disposed on a side surface of the reagent container 2 as long as the reagent container 2 can be heated and kept warm. The reagent container 2 may be enclosed so that the whole can be heated and kept warm. The temperature control mechanism 9 is controlled by the control unit 15 constantly, at regular time intervals and when a monitored temperature exceeds a threshold, and the control is selected optimally for a system. By controlling a temperature of the reagent such as heating the reagent and keeping the reagent warm, it is possible to cope with a temperature change during operations of the device, and there is an effect of preventing crystallization.

FIG. 1(a) shows the dispensing device in which the nozzle 4 and the port 5 are not connected, and FIG. 1(b) shows the dispensing device in which the nozzle 4 and the port 5 are connected. When it is desired to discharge the reagent into the reaction container 10, the nozzle 4 and the port 5 are not connected as shown in FIG. 1(a), and the reagent is discharged to the reaction container 10 by transferring the reagent with the liquid transfer mechanism 3. Arrows in the drawing indicate a flow of the liquid. When the reagent is not discharged into the reaction container 10 and left in a state of FIG. 1(a), a temperature of the vicinity of the temperature control mechanism 9 is kept, but the temperature of the reagent located away from the temperature control mechanism 9 cannot be kept. Therefore, when the reagent is not discharged into the reaction container 10, the nozzle 4 and the port 5 are connected as shown in FIG. 1(b) to form a circulation path in which the reagent sucked from the reagent container 2 returns to the reagent container 2 again. The reagent kept warm by the temperature control mechanism 9 is transferred by the liquid transfer mechanism 3 and returned to the reagent container 2 again through the nozzle 4 and the port 5, and the reagent is always replaced by a solution kept warm even in the reagent located away from the temperature control mechanism 9, so that the crystallization of the reagent can be prevented. A temperature of a reagent solution to be heated and kept warm depends on various factors such as a length of the pipe and a temperature at the time of work, and thus needs to be considered. The temperature of any reagent discharged into the reaction container 10 is an important factor in temperature considerations. For example, when there is an enzyme reaction in a reaction step after discharging into the reaction container 10, it is necessary to discharge at a temperature at which enzyme is not denatured. Therefore, it is necessary to consider a heating temperature and a warming temperature of the reagent container 2 according to a scale of the device and the reaction step. Although the temperature depends on the enzyme, generally, when there is an enzyme reaction step, the temperature of the solution to be discharged is 60° C. or lower. Further, for a flow rate of a circulating reagent, there is an effect of preventing the crystallization by a movement of molecules due to the flow of the reagent. There is an effect of reducing local non-uniformity of a reagent concentration. Therefore, the flow rate at which the crystallization of the reagent is prevented depends on environmental factors such as a coagulation temperature and a use temperature of the reagent to be used, but there is an effect of preventing the crystallization of the reagent as long as the flow rate is not zero. Therefore, the flow rate of the reagent is generally a flow rate in a movable range of the pump, and a flow rate at which the reagent does not leak at the connection between the nozzle and the port is appropriate. For example, a flow rate of about 600 uL per second is possible. In the present embodiment shows an example in which the temperature control mechanism 9 is provided, the crystallization of the reagent is prevented by circulating the reagent, and even when the temperature control mechanism 9 is not provided, the embodiment can be applied depending on the reagent to be used and application. The dispensing of the reagent described above, the connection of the nozzle and the port, the temperature of the reagent, the flow rate of the reagent related to reagent transferring, and the like are controlled by the control unit 15.

As an example of the nozzle, a tip end of the nozzle is a metallic material having an outer diameter of 0.3 mm, an inner diameter of 0.5 mm, and a length of about 94 mm, for example, a hollow nozzle of SUS, and the nozzle may have a conductive material and a structure capable of performing liquid level detection or detection by contacting a conductive area such as contact energization. Although the material of the nozzle is various, a material having chemical resistance may be used according to the reagent to be used.

As an example of the port, a material such as PEEK having an inner diameter of 0.65 mm can be used. A pipe diameter on a port side may be increased to reduce pressure loss. For example, the pipe diameter on the port side may be about twice a pipe diameter on a nozzle side.

The connection between the nozzle 4 and the port 5 includes, for example, connection by surface contact. In the embodiment, the port 5 has a tapered (mortar-shaped) opening portion. The nozzle has a tapered portion at the tip end and is sealed by contacting the tapered portion of the port, so that the reagent can be circulated without liquid leakage.

A pipe end on a reagent suction side of the reagent suction pipe 6 is disposed near a bottom of the reagent container 2 for convenience of using all the reagent in the reagent container 2. A pipe end on a reagent discharge side of the reagent discharge pipe 7 is disposed such that the circulated reagent enters the reagent container 2, and is disposed at a position different from the pipe end of the reagent suction pipe 6.

For example, as in the present embodiment, when the pipe end of the reagent discharge pipe 7 is disposed with a difference in height as compared with the pipe end of the reagent suction pipe 6, the reagent is easily mixed, and there is an effect of improving the non-uniformity of the temperature. Further, in order to improve the efficiency of stirring and mixing the solution in the reagent container 2 by circulating the solution without using a stirrer and the like, in addition to disposing the reagent discharge pipe 7 and the reagent suction pipe 6 with a difference in a height direction, the reagent discharge pipe 7 and the reagent suction pipe 6 can be disposed apart from each other in a lateral direction. Further, the reagent discharge pipe 7 and the reagent suction pipe 6 may be disposed apart from each other in both the height direction and the lateral direction. Further, in order to keep the pipe end of the reagent discharge pipe 7 away from the pipe end of the reagent suction pipe 6, an L-shaped pipe may be used.

There are various aspects of disposing the pipe end on the nozzle side and the pipe end on the port side. However, when focusing on the stirring of the reagent, it is important that the pipe end for reagent suction and the pipe end for reagent discharge are not adjacent to each other. A disposition interval varies depending on conditions such as a size of the reagent container.

Further, depending on a shape and a size of the reagent container 2, the pipe end of the reagent discharge pipe 7 and the reagent suction pipe 6 may be disposed adjacent to each other. When the pipe end of the reagent discharge pipe 7 is disposed near the pipe end of the reagent suction pipe 6, there is a high possibility that the reagent circulates only at the bottom of the reagent container 2. In this case, when the stirring of the reagent is also considered, an effect of stirring is improved by adjusting a direction of a reagent outlet at the pipe end.

A configuration of Embodiment 1 can be similarly performed in Embodiment 2 and Embodiment 3.

Embodiment 2

FIG. 3 is a schematic configuration diagram of a dispensing device according to Embodiment 2. As shown in FIG. 3, the dispensing device 1 according to the present embodiment includes the reagent container 2 containing the reagent, the liquid transfer mechanism 3, a liquid transfer mechanism 11, the nozzle 4, the port 5, the reagent suction pipe 6, the reagent discharge pipe 7, the temperature control mechanism 9, and the control unit 15. Two pipes of the reagent suction pipe 6 connected to the nozzle 4 and the reagent discharge pipe 7 connected to the port 5 are connected to the reagent container 2.

The contents described in Embodiment 1 related to the reagent container 2, the nozzle 4, the port 5, the reagent suction pipe 6, the reagent discharge pipe 7, and the temperature control mechanism 9 can be similarly performed in the present embodiment.

A difference between Embodiment 1 and Embodiment 2 is that two liquid transfer mechanisms, that is, the liquid transfer mechanism 3 and the liquid transfer mechanism 11, are disposed.

FIG. 3 shows a liquid transfer mechanism using a syringe pump in the liquid transfer mechanism 3 as an example. The liquid transfer mechanism 11 is an example of being disposed between the port 5 on the reagent discharge pipe 7 and the reagent container 2. The liquid transfer mechanism 3 is a liquid transfer mechanism for dispensing and circulating the reagent, and the liquid transfer mechanism 11 is mainly used for circulation. An effect of the liquid transfer mechanism 11 is an effect of preventing leakage at the port 5 due to suction of the reagent. Further, the liquid transfer mechanism 3 can transfer the liquid by a dispensing mechanism with high accuracy, and the liquid transfer mechanism 11 can circulate the reagent using a liquid transfer mechanism with low liquid amount accuracy. By using the liquid transfer mechanisms having different liquid transfer accuracy as described above, highly accurate solution dispensing and efficient solution circulation can be realized. For example, as shown in FIG. 3, an accurate syringe pump may be used for the liquid transfer mechanism 3, and a peristaltic pump may be used for the liquid transfer mechanism 11.

The liquid transfer mechanism 11 can be disposed between the reagent container 2 and the nozzle 4. In this case, the effect of preventing leakage of the liquid transfer mechanism 11 at the port 5 due to the suction of the reagent, which is one of the effects, cannot be expected. However, the highly accurate solution dispensing and the efficient solution circulation can be realized by using the liquid transfer mechanisms having different liquid transfer accuracy. The control unit 15 controls liquid transfer operations of the liquid transfer mechanism 3 and the liquid transfer mechanism 11, and controls the dispensing of the reagent, the connection of the nozzle and the port, the temperature of the reagent, the flow rate of the reagent related to the reagent transferring, and the like.

Embodiment 3

Embodiment 3 is an embodiment of a sample analysis device in which the dispensing device according to Embodiment 1 or Embodiment 2 is mounted and used.

FIG. 4 is a schematic configuration diagram of the sample analysis device according to Embodiment 3. As shown in FIG. 4, a sample analysis device 200 according to the present embodiment includes three test units including a nucleic acid extraction unit 201, a reagent and reaction liquid preparation unit 202, and a measurement unit 203, each of which corresponds to an individual test step, and a transport mechanism 204 for transporting a container between the test units.

The nucleic acid extraction unit 201 includes a sample introduction unit 205 for introducing a container that encloses a sample into the device, a pipette mechanism for dispensing the sample, a container transport mechanism for transporting the container in the unit, and an extraction mechanism 2011 for extracting nucleic acids from the sample. Hereinafter, an integrated mechanism of the pipette mechanism and the container transport mechanism is referred to as a pipette and transport mechanism 2012.

The extraction mechanism 2011 is configured to dissolve the sample and purify (extract) the nucleic acid in the sample, and in the configuration, includes a dispensing device 1(a) for dispensing a first reagent and a dispensing device 1(b) for dispensing a second reagent. The dispensing device 1(a) and the dispensing device 1(b) are the dispensing devices according to Embodiment 1 or Embodiment 2. Configurations of the dispensing device 1(a) and the dispensing device 1(b) are exactly the same, and the only difference is a type of the reagent contained in the reagent container 2.

The reagent and reaction liquid preparation unit 202 includes a pipette mechanism for dispensing the reagent, a container transport mechanism for transporting the container in the unit, a reagent installing unit, and a reaction liquid preparation unit 2021. Hereinafter, an integrated mechanism of the pipette mechanism and the container transport mechanism is referred to as a pipette and transport mechanism 2022.

The reaction liquid preparation unit 2021 includes, for example, a mechanism for preparing an installed reagent, a mechanism for preparing a nucleic acid sample and the reagent, a stirring mechanism according to requirements for a mounted genetic test method, a plugging mechanism, a heating mechanism, and the like.

The measurement unit 203 includes a container transport mechanism 2032 for transporting the container in the unit, a real-time fluorescence measurement mechanism 2031, and a data processing unit 2033 for processing fluorescence measurement data.

The transport mechanism 204 includes a transport rack 208 for accommodating a plurality of reaction containers 10 containing the samples and the reagents. By transporting the transport rack 208, the three test units including the nucleic acid extraction unit 201, the reagent and reaction liquid preparation unit 202, and the measurement unit 203 are moved back and forth.

Next, operations of the sample analysis device 200 will be described. After the sample is introduced into the sample introduction unit 205, the nucleic acid extraction unit 201 performs a sample dissolving step, a nucleic acid binding step, a washing step, and a sample elution step to extract nucleic acids. Next, the reagent and reaction liquid preparation unit 202 performs a reagent preparation step and a reaction sample preparation step to prepare a liquid so as to be able to be analyzed. Finally, the measurement unit 203 performs a sample mechanism loading step, a detection step, an analysis step, and an unloading step to analyze the sample.

Operations of the nucleic acid extraction unit 201 will be described in more detail. Until a step of discharging the reagent of the nucleic acid extraction unit 201 is started, in the dispensing devices 1(a) and 1(b), the nozzle 4 and the port 5 are connected, the liquid transfer mechanism 3 transfers the reagent kept warm by the temperature control mechanism 9, and the reagent is returned to the reagent container 2 again through the nozzle 4 and the port 5 to prevent the crystallization of the reagent.

First, the reaction container 10 is transported to the transport rack 208 on the transport mechanism 204 by the pipette and transport mechanism 2012. Next, a dispensing tip is attached to the dispensing and transport mechanism 2012, and the sample stored in the sample introduction unit 205 is sucked. Next, the sucked sample is discharged into the reaction container 10 on the transport rack 208. The reaction container 10 on the transport rack 208 is transported and moved to a first reagent discharge position.

Since the discharge of the first reagent is started, the nozzle 4 and the port 5 of the dispensing device 1(a) are disconnected, and the nozzle 4 is moved above the transport mechanism 204. The first reagent is discharged into the reaction container 10 by transferring the reagent by the liquid transfer mechanism 3. When the discharge of the first reagent is completed, the nozzle 4 is moved above the port 5, the nozzle 4 is connected to the port 5, the reagent kept warm by the temperature control mechanism 9 is transferred by the liquid transfer mechanism 3, and the reagent is returned to the reagent container 2 again through the nozzle 4 and the port 5 to prevent the crystallization of the reagent.

Next, the reaction container 10 on the transport rack 208 is moved from the first reagent discharge position to a second reagent discharge position. Since the discharge of the second reagent is started, the nozzle 4 and the port 5 of the dispensing device 1(b) are disconnected, and the nozzle 4 is moved above the transport mechanism 204. The second reagent is discharged into the reaction container 10 by transferring the reagent by the liquid transfer mechanism 3. When the discharge of the second reagent is completed, the nozzle 4 is moved above the port 5, the nozzle 4 is connected to the port 5, the reagent kept warm by the temperature control mechanism 9 is transferred by the liquid transfer mechanism 3, and the reagent is returned to the reagent container 2 again through the nozzle 4 and the port 5 to prevent the crystallization of the reagent.

Next, a nucleic acid extraction processing is performed by the extraction mechanism 2011, and the extracted nucleic acid is transported from the nucleic acid extraction unit 201 to the reagent and reaction liquid preparation unit 202 by the transport mechanism 204. The description of a subsequent processing is omitted.

Although the present embodiment is an example of a genetic test device, the invention includes application to other devices for analysis such as biochemical analysis, and is not limited to the genetic test device.

REFERENCE SIGN LIST

1: dispensing device
2: reagent container
3: liquid transfer mechanism
4: nozzle
5: port
6: reagent suction pipe
7: port side pipe
9: temperature control mechanism
10: reaction container
11: liquid transfer mechanism
12: syringe pump
13: electromagnetic valve
15: control unit
200: sample analysis device
201: nucleic acid extraction unit
202: reagent and reaction liquid preparation unit
203: measurement unit
204: transport mechanism
205: sample introduction unit
208: transport rack
2011: extraction mechanism
2012: pipette and transport mechanism

2021: reaction liquid preparation unit
2022: pipette and transport mechanism
2031: real-time fluorescence measurement mechanism
2032: container transport mechanism
2033: data processing unit

The invention claimed is:

1. A dispensing device comprising:
a nozzle configured to discharge a reagent into a reaction container;
a reagent suction pipe connecting the nozzle and a reagent container holding the reagent;
a port capable of being connected to the nozzle;
a reagent discharge pipe connecting the port and the reagent container;
a liquid transfer mechanism capable of transferring the reagent into the reagent suction pipe and the reagent discharge pipe; and
a control unit configured to control a connection state of the nozzle and the port, and liquid transfer of the liquid transfer mechanism,
wherein the control unit performs control such that in response to determining that the reagent is dispensed, the nozzle and the port are disconnected, and the reagent sucked from the reagent container through the reagent suction pipe is discharged into the reaction container, and in response to determining that the reagent is not dispensed, the nozzle and the port are connected, and the reagent in the reagent container is circulated into the reagent suction pipe and the reagent discharge pipe.

2. The dispensing device according to claim 1, further comprising:
a temperature control mechanism of the reagent container.

3. The dispensing device according to claim 1,
wherein a position of a pipe end of the reagent suction pipe configured to suck the reagent from the reagent container is not adjacent to a position of a pipe end of the reagent discharge pipe connected to the reagent container.

4. A sample analysis device comprising:
the dispensing device according to claim 1;
a sample introduction unit;
a fluorescence measurement mechanism;
a data processing unit; and
a container transport mechanism.

5. A dispensing device comprising:
a nozzle configured to discharge a reagent into a reaction container;
a reagent suction pipe connecting the nozzle and a reagent container holding the reagent;
a port capable of being connected to the nozzle;
a reagent discharge pipe connecting the port and the reagent container;
a first liquid transfer mechanism capable of dispensing the reagent from the nozzle into the reaction container;
a second liquid transfer mechanism capable of transferring the reagent into the reagent suction pipe and the reagent discharge pipe; and
a control unit configured to control liquid transfer of the first liquid transfer mechanism capable of dispensing the reagent, a connection state of the nozzle and the port, and liquid transfer of the second liquid transfer mechanism,
wherein the control unit controls the first liquid transfer mechanism and the second liquid transfer mechanism such that
in response to determining that the reagent is dispensed, the nozzle and the port are disconnected, and the reagent sucked from the reagent container through the reagent suction pipe is discharged into the reaction container by the first liquid transfer mechanism, and
in response to determining that the reagent is not dispensed, the nozzle and the port are connected, and the reagent in the reagent container is circulated into the reagent suction pipe and the reagent discharge pipe.

6. The dispensing device according to claim 5, further comprising:
a temperature control mechanism of the reagent container.

7. The dispensing device according to claim 5,
wherein a position of a pipe end of the reagent suction pipe configured to suck the reagent from the reagent container is not adjacent to a position of a pipe end of the reagent discharge pipe connected to the reagent container.

8. A sample analysis device comprising:
the dispensing device according to any one of claim 5;
a sample introduction unit;
a fluorescence measurement mechanism;
a data processing unit; and
a container transport mechanism.

* * * * *